Sept. 23, 1952     J. ZUCKER     2,611,597
APPARATUS FOR CARBONATION OF A LIQUID
Filed Nov. 12, 1948
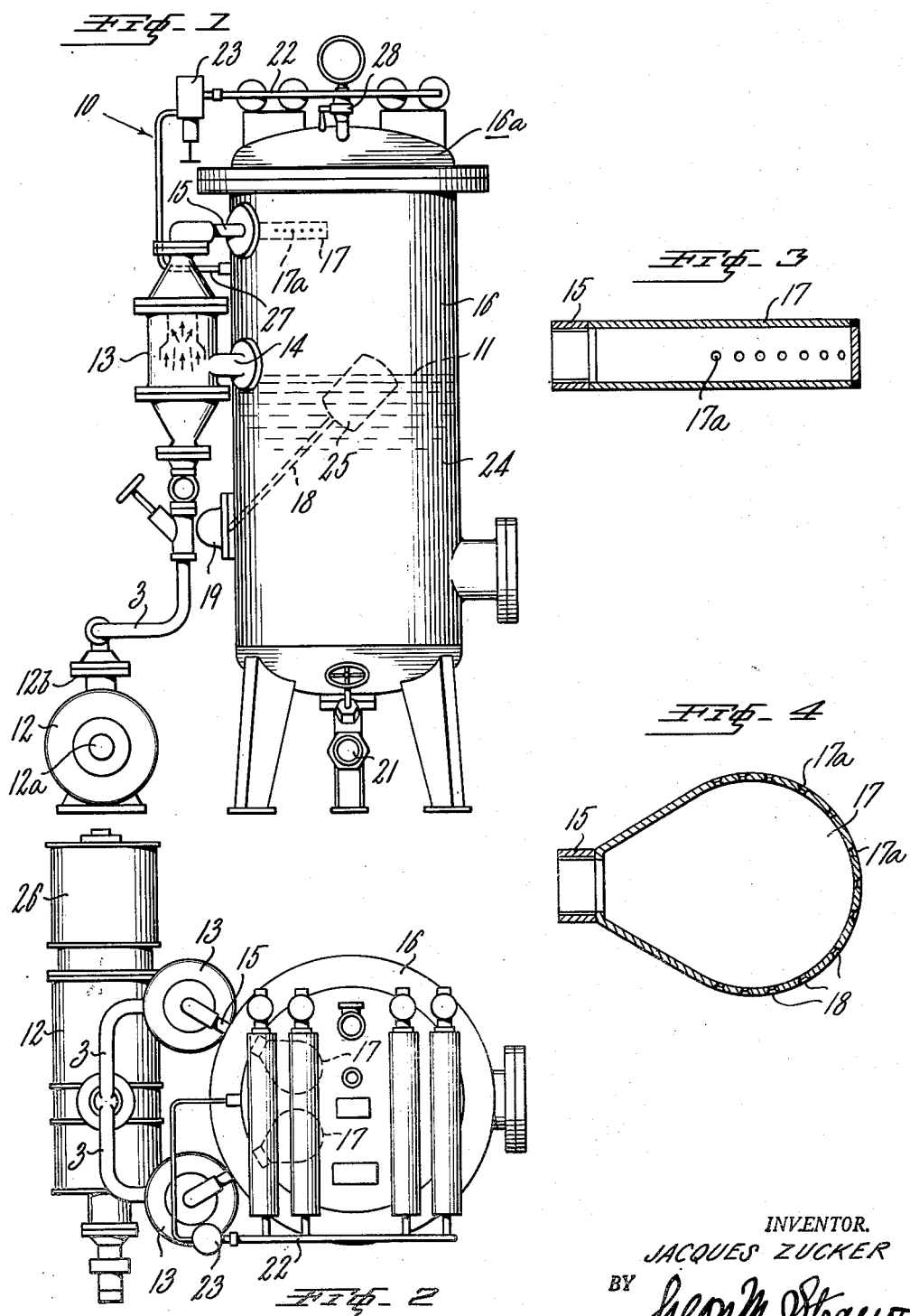
INVENTOR.
JACQUES ZUCKER Patented Sept. 23, 1952

2,611,597

UNITED STATES PATENT OFFICE 2,611,597

APPARATUS FOR CARBONATION OF A LIQUID

Jacques Zucker, Zurich, Switzerland

Application November 12, 1948, Serial No. 59,685
In Switzerland August 19, 1948

1 Claim. (Cl. 261—115)

This invention relates to an apparatus for carbonation of a liquid. Carbon dioxide is generally used for carbonating liquids whereby a maximum saturation of the liquid with the gas is desired.

The carbonation apparatus according to the present invention has as particular features a settling tank, injector means outside said tank and in communication with the latter and spray nozzle means positioned in said tank and connected to the upper end of said injector means, whereby first a preimpregnation of the liquid with carbon dioxide gas takes place within the injector means and then the desired saturation of the liquid with the gas is attained upon atomization in the nozzle means of such gas-preimpregnated liquid within the settling tank.

Various other novel characteristics and advantages of the invention may be gathered from the following description and claim and from the accompanying drawing, wherein:

Fig. 1 is an elevational view of an apparatus embodying the invention;

Fig. 2 is a top plan view of the apparatus of Fig. 1;

Figs. 3 and 4 show vertical and horizontal sectional views, respectively, of the spray nozzle device.

Referring now more particularly to the drawing, there is shown an apparatus 10 which is connected to a centrifugal pump or similar supply source 12 having the intake connection 12a for the liquid and a pressure connection 12b, the latter being connected through a conduit 3 with the injector means 13. The injector means 13 is positioned outside of a settling tank 16. A pipe connection 14 thereof connects to the settling tank at the level 11 of the tank above which carbon dioxide gas extends and below which the liquid 24 to be carbonated is contained.

At the upper end of the injector means 13 there extends an upper pipe 15 into the tank 16 and terminates in a spray nozzle head or device 17. Within tank 16 is arranged a float body 25 supported on a suitable lever 18 which in turn operates a switch 19. This switch controls the current supply for the motor 26 of pump 12.

It is to be noted that in accordance with the invention, as soon as liquid, such as water, is pumped under pressure through conduit 3 into the injector aggregate 13, the liquid will suck carbon dioxide gas into the injector 13 from tank 16 from above level 11 into the injector, whereby the liquid is preimpregnated outside of the tank 16 with carbon dioxide gas.

Carbon dioxide gas is introduced into the tank above level 11 through supply pipe 27 leading into the tank 16. As soon as the gas-preimpregnated liquid is forced through pipe 15 into the spray nozzle head 17 it will be atomized therein by passing through openings 17a thereof, whereby any air contained in the preimpregnated liquid will be separated from the latter due to the fact that air is lighter in weight than the carbon dioxide gas contained in the liquid.

The atomization effectuates an enlargement of the surface of the preimpregnated liquid, which surface comes subsequently in contact with a zone of carbon dioxide gas above the liquid level 11.

It is further to be noted that carbon dioxide is more readily absorbed by the liquid or water than air which, after atomization of the liquid, is permitted to rise to upper part 16a of the apparatus and to escape through air valve 28 which releases from time to time the accumulated air within the tank. The zone of carbon dioxide gas above level 11, the latter being controlled by the float 25, constitutes a final gas saturation zone for the atomized gas-impregnated liquid.

The carbonated liquid 24 within the tank 16 may then be discharged through faucet 21 to drain off the completely carbonated liquid. Carbon dioxide gas in gas or liquid form instead of being introduced directly through pipe 27 may also flow first through a manifold 22 and a pressure reduction valve 23 as indicated in the top part of the apparatus.

The level 11 of the liquid to be carbonated is regulated as aforesaid by float 25 which controls the power supply to the motor when the liquid reaches in a known manner a predetermined level within the tank and below the pipe line 14 through which carbon dioxide gas is supplied into the injector means 13 positioned outside the tank in which the liquid undergoes a primary carbonation or preimpregnation by the sucked in carbon dioxide gas which mixes readily with the liquid.

The apparatus as hereinabove described is especially suitable for carbonating fruit juices, water and like liquids and achieves a very high degree of saturation with carbon dioxide gas. It can thus be seen that there has been provided according to the invention a device for carbonating liquid which employs pump means for said liquid, a settling tank, injector means arranged outside said tank, conduit means leading from said pump means to said injector means, first pipe means connecting said injector means with the interior of said tank at a predetermined level thereof, second pipe means connecting said injector means with the tank above the aforesaid level, whereby a gas zone is obtained within the tank between said first pipe means and said second pipe means so that liquid supplied to said injector means sucks through said first pipe means gas from within said tank therewithout into and through said injector means to thereby attain a precarbonation of said liquid, atomizing nozzle means connected to said second pipe means and located within said tank whereby the precarbonated liquid is atomized within said tank and is permitted to pass through said zone of gas while air contained in said liquid is permitted to rise above said gas zone, and air-escape means for discharging accumulated air above said gas zone.

Having thus described the invention, what is claimed as new and desired to be secured by Letters Patent, is:

A device for carbonating liquid comprising pump means for said liquid, a settling tank, injector means for said liquid and arranged outside said tank, conduit means leading from said pump means to said injector means whereby liquid is supplied under pressure through said injector means, first pipe means connecting said injector means with the interior of said tank at a predetermined level thereof, second pipe means connecting said injector means with said tank above said injector means and above said predetermined level, whereby liquid supplied to said injector means sucks through said first pipe means gas above said predetermined level from within said tank therewithout into said injector means to thereby obtain a preimpregnation of said liquid with said gas, atomizing nozzle means connected to said second pipe means and located within said tank, whereby said preimpregnated liquid from said injector means is subjected to atomization within said nozzle means to thereby obtain an enlargement of the surface of the preimpregnated liquid and freeing of air from the latter, respective release means on the top of said tank and adjacent the bottom thereof for discharge air from said tank and for discharge carbonated liquid therefrom, said liquid extending within said tank up to said predetermined level, and float means for controlling the operation of said pump and substantially maintaining said carbonated liquid within said tank at said predetermined level.

JACQUES ZUCKER.

REFERENCES CITED

The following references are of record in the file of this patent:

UNITED STATES PATENTS

| Number | Name | Date |
| --- | --- | --- |
| 1,808,956 | Kitterer | June 9, 1931 |
| 2,172,420 | Tweed | Sept. 12, 1939 |
| 2,235,357 | Conklin | Mar. 18, 1941 |
| 2,252,313 | Bostock | Aug. 12, 1941 |
| 2,339,640 | Holinger | Jan. 18, 1944 |